United States Patent [19]

Jablonsky

[11] 4,228,696
[45] Oct. 21, 1980

[54] STEERING GEAR FOR MOTOR VEHICLES

[75] Inventor: Erich Jablonsky, Boebingen, Rems, Fed. Rep. of Germany

[73] Assignee: Zahnradfabrik Friedrichshafen, A.G., Friedrichshafen, Fed. Rep. of Germany

[21] Appl. No.: 932,639

[22] Filed: Aug. 10, 1978

[30] Foreign Application Priority Data

Aug. 10, 1977 [DE] Fed. Rep. of Germany ....... 2635958

[51] Int. Cl.² ..................... B62D 3/06; F16H 25/22; F16H 55/28
[52] U.S. Cl. .................................. 74/499; 74/89.15; 74/409; 74/422; 74/424.8 R; 74/441
[58] Field of Search ............... 74/89.15, 409, 422, 74/441, 424.8 R, 499

[56] References Cited

U.S. PATENT DOCUMENTS

| 2,916,945 | 12/1959 | Rittenhouse et al. | 74/499 |
|---|---|---|---|
| 3,805,634 | 4/1974 | White | 74/441 |
| 3,810,399 | 5/1974 | Schluckebier | 74/499 |

FOREIGN PATENT DOCUMENTS 919576  2/1963  United Kingdom ................ 74/499

Primary Examiner—Allan D. Herrmann
Attorney, Agent, or Firm—Zalkind & Shuster

[57] ABSTRACT

Means for adjusting automatically for backlash caused by wear between the teeth of a steering nut gear rack on a steering shaft worm and the teeth of a steering mechanism gear sector which engages the rack teeth. The invention utilizes a resiliently biased, e.g., spring pressed pin carried either by the steering nut member or the gear sector member and pressing against a tooth of the other to maintain a constant torque bias of the steering nut maintaining it to a rotated position on the steering shaft. Thus, the teeth of the two members will always effect engagement with no backlash when such members are positioned with respect to each other for straight-ahead steering. When steering is initiated the response is immediate and there is no play due to looseness between steering nut rack and gear sector teeth.

9 Claims, 4 Drawing Figures

STEERING GEAR FOR MOTOR VEHICLES

The known prior art is the U.S. Patent to Rittenhouse et al, U.S. Pat. No. 2,916,945, which shows a steering shaft worm carrying a steering nut having a rack engaging a gear sector wherein the rack teeth are on a slope with respect to the axis of the gear sector and the gear sector teeth likewise sloped being on a conical hub and thus narrower and weaker at one end than at the other.

A spring biased pin is carried by the housing of these members and engages a button having general cam shape or spherical face carried on the side of the gear sector. Thus, the pin maintains a constant pressure on the gear sector urging it in axial direction so that the ends of the teeth where they taper are narrower and therefore weaker in engagement with the rack teeth.

The button forms a projection which by engagement with the pin effects a detent to hold a center or straight ahead steering position. In order to take up play it is necessary for the spring which biases the pressure pin in the patent to be sufficiently strong to axially shift the gear sector shaft against the bias of its own spring.

The prior art patent thus described has drawbacks due to the tapering teeth being necessarily narrower and therefore weaker than the teeth on the rack of the steering nut. Additionally, the manufacture of such conical base or hub gearing is more expensive than cylindrical base or hub gearing as used in the present invention and the use of a button having a cam face on which the spring pressed pin must ride to come to a center position after a steering function is disadvantageous to the return action.

The present invention in addition to being economical in production costs utilizes less space since no elements need be carried by the steering gear housing and all teeth being of uniform thickness do not have any narrowed and thus weakened end portions, as is the case with conical hub gears. Accordingly, the teeth of the invention are stronger throughout their entire length, and larger in flank area, which decreases wear and tear.

In the present invention a resiliently biased pin is utilized which may be carried by either member, that is the gear sector or the steering nut and engaging a tooth of the other member, eliminating the customary adjusting screw prevalent in the prior art as in the Rittenhouse et al patent, which necessarily enlarges the overall configuration of the housing. Accordingly the invention can be used where space is more confining than would be possible with prior art arrangements. Further, by the use of a standard cylindrical base for the teeth the gear sector teeth are equal in thickness throughout their lengths and thus have a maximum width and flank area giving a better distribution of load and lower wear.

The back taper of the depth on the diminishing end of the gear sector is eliminated by the use of a cylindrical base and the arrangement of the invention provides primarily for a rolling engagement between the pressure pin and the tooth with which it ultimately engages for centered position instead of a dragging condition as experienced in the button and detent cam arrangement of prior art.

A detailed description of the invention now follows in conjunction with the appended drawing in which.

Figure 1:
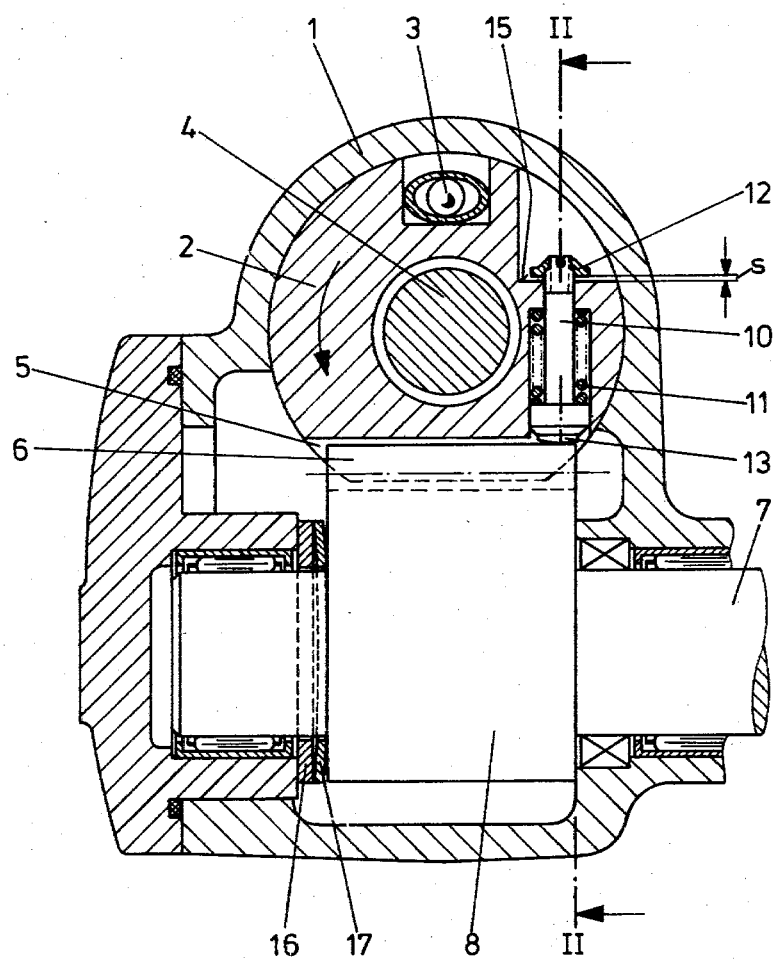
FIG. 1 is a radial cross section through a worm gear nut with a gear rack meshing with a steering mechanism gear sector and wherein is shown the device for maintaning a rotational torque force on the nut to take up backlash and carried by the nut.
Figure 2:
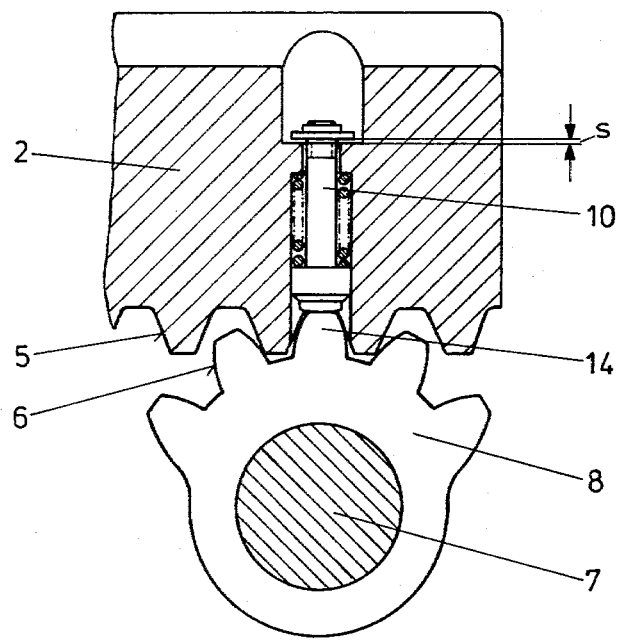
FIG. 2 is a cross section taken longitudinally on line II—II of FIG. 1 showing the coaction of the take up device with the gear sector and steering nut.

Referring to FIGS. 1 and 2, a worm gear steering nut 2 is illustrated which will be understood to act simultaneously as a double acting piston in a hydraulic power steering booster system in a known manner. The steering nut 2 reciprocates in the steering gear housing 1 which will be understood to effect the chambers of a hydraulic power cylinder and coacts with a worm on steering spindle 4 in a conventional manner via ball chain 3, and has inherently a relative rotation thereon to a certain degree as in U.S. Pat. No. 2,916,945. Additionally, steering nut 2 has rack teeth 5 which engage with teeth 6 of a steering gear sector 8 keyed to shaft 7, which will be understood to actuate a steering linkage. The width of the flat flank teeth 5 is about equal to that of the curved flank teeth 6 in order to effect a favorable distribution of tooth load and FIG. 2 shows the centered position of the teeth of straight ahead steering.

A biasing torque device for backlash takeup comprises a compression spring arrangement wherein a pressure pin 10 transversely or angularly related to the axis of steering nut 2 is carried in the steering nut 2 e.g., secantially in an offset bore (FIG. 2) provided between the middle teeth of the rack 3. The pin is secured by a nut 12 as shown and around the pin and within the bore is a compression spring 11 which is stressed between the end of the bore and a suitably shaped crown head 13 of the pin. The head 13 is biased by spring 11 against the crown of the central tooth 14 of the gear sector 8, as seen in FIG. 2, whereby, as will be understood from FIG. 1, the off-center position of the biasing take up device will produce a torque force on steering nut 2 in the direction of the arrow. It is understood that sufficient relative rotation between the steering nut 2 and the steering shaft 4 is inherent in the mechanism to permit such rotation. As seen in FIG. 1, the clearance "s" between a shoulder machined into the steering nut 2 and the securing nut 12 represents the amount of movement of pin 10 effected by engagement of head 13 with tooth 14. Thus the spring 11 exerts the rotary force on nut 2 to effect a takeup of clearance due to wear between teeth 5 and teeth 6 when the relative positions of the steering nut 2 and gear sector 8 are set for straight ahead steering as shown in FIG. 2. This is, of course, effected automatically. The resilient force of the pin on tooth 14 at that time serves as a detent in centered position.

During actuation of steering nut 2 to effect steering from the position shown in FIG. 2, pin 10 disengages from tooth 14 and no longer serves to take up wear.

Pin 10 is adjustable by means of nut 12 with respect to its position in the bore to be properly re-engaged by tooth 14 in return from a steering movement so as to hold the centered position of gear sector 8. The steering linkage actuating shaft 7 is axially fixed as by a ring washer 16 and spring washer 17 so as to maintain a preset position of the gear sector relative to the steering nut and the need to shift the gear sector shaft as in the prior art is eliminated.

Figure 3:
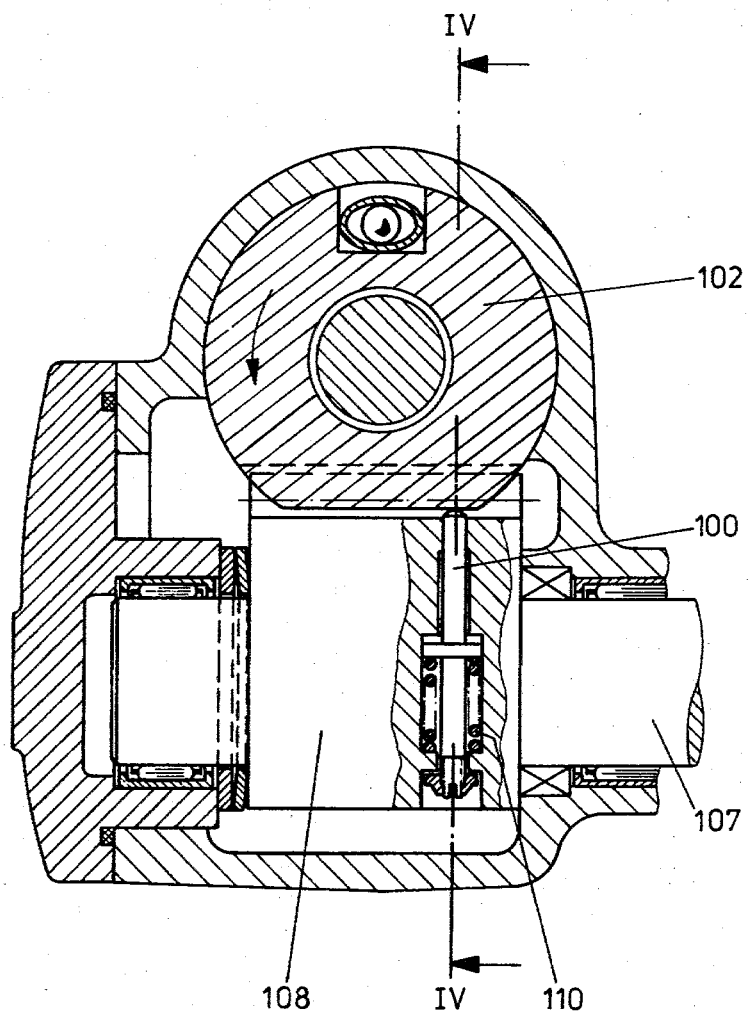
FIG. 3 illustrates a modification, essentially a reversal of parts wherein the take up device is carried by the gear sector rather than the steering nut.
Figure 4:
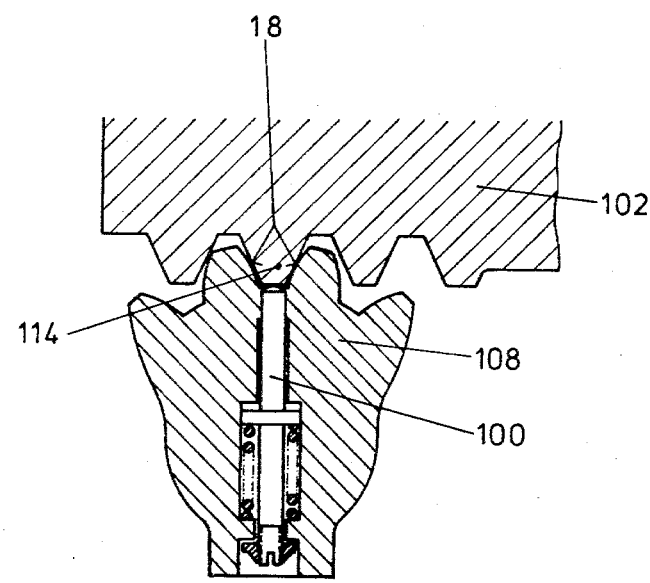
FIG. 4 is a sectional view through IV—IV of FIG. 3.

In the form of the invention shown in FIGS. 3 and 4, the pressure pin 100 is loaded by spring 110 housed in the gear sector 108 which has a suitably provided radial bore which opens in the valley 18 between a pair of central teeth as shown in FIG. 4. Once again the bore axis is offset relative to the axis of steering nut 102. The pressure of the pin is brought to bear on the crown of a central tooth 114 of a gear rack on steering nut 102. As will be evident from FIG. 3, the bias torque exerted by the compression spring effects a counter clockwise rotation of the steering nut to take up a backlash between the teeth of the rack and the gear sector removing play therebetween.

The invention has the advantage that the force transmitted to the steering nut is effected substantially as a rolling pressure point since the pressure pin and the gear sector of FIG. 1 or the pressure pin and the steering nut of FIG. 3 move toward each other at equal speed on return movement from the straight ahead steering position. There is no sliding or dragging as is occasioned by the prior art U.S. Pat. No. 2,916,945 hereinabove mentioned. Inasmuch as the pressure pin in any steering position relationship of the steering nut and the gear sector comes out of contact with the tooth that it normally abuts in straight ahead steering, only a small additional friction force would occur in such return movement. Accordingly, return movement characteristics are considerably improved. Additionally, the elimination of a button to be engaged by the pressure pin simplifies manufacture and cost thereof.

The invention may be used either in an auxiliary booster power steering system as well as in ordinary mechanical steering systems and from the foregoing is a spring biased pin carried in an offset bore of either member where the pin is reciprocal on an axis angularly related to the axis of the gear sector member so as to maintain a torque force that automatically maintains tooth engagement.

I claim:

1. The combination in a steering mechanism of a worm gear steering nut member having a gear rack, and a gear section member engaged therewith including a steering shaft carrying said steering nut member and on which the said steering nut member has relative rotation;
    resilient bias means carried intermediate said steering nut member and said gear sector member to adjust for backlash disposed to exert a torque force on said steering nut member effecting said relative rotation whereby the teeth of said steering nut rack and said gear sector member are maintained in flank engagement.

2. The combination as set forth in claim 1, including means for holding the gear sector member in axially fixed position comprising a spring washer.

3. A combination as set forth in claim 1, wherein said resilient bias means comprises a resiliently biased pin carried by said steering nut member and disposed to press against the crown of a tooth on said gear sector member when said steering nut member and gear sector member are related for straight ahead steering.

4. The combination as set forth in claim 1, wherein said resilient bias means comprises a resiliently biased pin disposed to abut against the crown of a tooth on said rack gear when said steering nut member and gear sector member are in position for straight ahead steering and said pin being carried by said gear sector member.

5. The combination as set forth in claim 1, wherein the said gear sector member has a cylindrical base with curved flank teeth thereon and said steering nut member has flat flank teeth thereon to effect a rolling pressure point in transmitting force therebetween to minimize tooth friction during return movement from a steering position.

6. The combination as set forth in claim 1, wherein said resilient bias means comprises a spring biased pin carried by one member and abutting a tooth of the other member.

7. The combination as set forth in claim 1, wherein said resilient bias means comprises a spring biased pin carried by one member and abutting a tooth of the other member wherein the tooth being abutted by said pin is a center tooth of said other member when said members are in relative position for straight ahead steering.

8. The combination set forth in claim 7, wherein the carrying member is provided with a bore accommodating said spring biased pin and said pin being reciprocal on an axis offset of the axis of the steering nut member and angularly related thereto to effect a torque force;
    said bore being open between central teeth of said carrying member whereby said pin has engaging access with said abutted tooth.

9. The combination as set forth in claim 8, said bore and pin being constructed and arranged to effect movement of said pin on an axis offset said steering nut member axis and transversely thereof.

* * * * *